United States Patent
Ma et al.

(10) Patent No.: US 8,217,903 B2
(45) Date of Patent: Jul. 10, 2012

(54) ELECTRONIC DEVICE AND TACTILE TOUCH SCREEN

(75) Inventors: ZhongMing Ma, Waterloo (CA); Robert Lowles, Waterloo (CA); Edward Hui, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1180 days.

(21) Appl. No.: 11/934,204

(22) Filed: Nov. 2, 2007

(65) Prior Publication Data

US 2009/0115733 A1    May 7, 2009

(51) Int. Cl.
G09G 5/00    (2006.01)

(52) U.S. Cl. ......... 345/173; 345/156; 345/161; 345/167

(58) Field of Classification Search .................. 345/173, 345/156, 161, 167
See application file for complete search history.

(56) References Cited

U.S. PATENT DOCUMENTS

| | | | |
|---|---|---|---|
| 5,718,588 A * | 2/1998 | Tretiakoff et al. ............ | 434/114 |
| 6,724,370 B2 | 4/2004 | Dutta et al. | |
| 2002/0173344 A1 | 11/2002 | Cupps et al. | |
| 2004/0108995 A1 | 6/2004 | Hoshino et al. | |
| 2006/0109254 A1 | 5/2006 | Akieda et al. | |
| 2006/0119586 A1 | 6/2006 | Grant et al. | |
| 2006/0181517 A1 | 8/2006 | Zadesky et al. | |
| 2006/0197753 A1 | 9/2006 | Hotelling | |
| 2006/0209037 A1 * | 9/2006 | Wang et al. .................... | 345/173 |
| 2007/0247429 A1 | 10/2007 | Westerman | |
| 2008/0238635 A1 * | 10/2008 | Klinghult et al. .......... | 340/407.1 |

FOREIGN PATENT DOCUMENTS

| | | |
|---|---|---|
| CN | 1392977 A | 1/2003 |
| DE | 19962552 | 7/2001 |
| EP | 1450247 | 8/2004 |
| JP | 11-282605 | 10/1999 |
| JP | 2002-149312 | 5/2002 |
| JP | 2006-146611 | 6/2006 |
| JP | 2007-513294 | 5/2007 |
| KR | 2002-0037771 | 5/2002 |

OTHER PUBLICATIONS

"MultiTouch 2.0 comes to Apple computers", Nov. 22, 2007, http://pcjoint.com/multitouch-20-comes-to-apple-devices/. European Application No. 07119865.9 Search Report dated Apr. 9, 2008.
Office Action issued Feb. 5, 2010, in respect of corresponding Chinese Patent Application No. 200810170800.2.
Office Action dated May 6, 2011, issued from the corresponding Chinese patent application No. 200810170800.2.

* cited by examiner

*Primary Examiner* — Nitin Patel
*Assistant Examiner* — Leonid Shapiro
(74) *Attorney, Agent, or Firm* — Geoffrey deKleine; Borden Ladner Gervais LLP

(57) ABSTRACT

An electronic device includes a base, a touch screen display, a shape memory alloy and operational components. The touch screen display is connected to the base and moveable relative to the base and includes a display device and a touch-sensitive input surface overlying the display device and connected to a controller for determining a touch event to the touch-sensitive input surface. The shape memory alloy is disposed between the base and the display device and is configured to change shape in response to conduction of an electric current to cause movement of the display device relative to the base. The operational components include a processor between the base and the touch screen display. The processor is operatively connected to the controller, the display device and the shape memory alloy for causing conduction of current through the shape memory alloy in response to the touch event, resulting in movement of the display relative to the base.

15 Claims, 7 Drawing Sheets

ELECTRONIC DEVICE AND TACTILE TOUCH SCREEN

FIELD OF TECHNOLOGY

The present application relates to tactile feedback from touch screen devices.

BACKGROUND

Electronic devices, including portable electronic devices, have gained widespread use and can provide a variety of functions including, for example, telephonic, electronic messaging and other personal information manager (PIM) application functions. Portable electronic devices can include several types of devices including mobile stations such as simple cellular telephones, smart telephones, wireless PDAs, and laptop computers with wireless 802.11 or Bluetooth capabilities. These devices run on a wide variety of networks from data-only networks such as Mobitex and DataTAC to complex voice and data networks such as GSM/GPRS, CDMA, EDGE, UMTS and CDMA2000 networks.

Devices such as PDAs or smart telephones are generally intended for handheld use and easy portability. Smaller devices are generally desirable for portability. A touch screen input/output device is particularly useful on such handheld devices as such handheld devices are small and are therefore limited in space available for user input and output devices. Further, the screen content on the touch screen devices can be modified depending on the functions and operations being performed.

Touch screen devices are constructed of a display, such as a liquid crystal display, with a touch-sensitive overlay. These input/output devices suffer from inherent disadvantages relating to user interaction and response, however. In particular, such touch screen devices fail to provide a user-desirable tactile quality for positively indicating input, providing a poor user-experience. For example, audio output and vibrational devices do not provide a desirable tactile quality.

Improvements in touch screen devices are therefore desirable.

BRIEF DESCRIPTION OF THE DRAWINGS

Embodiments of the present application will now be described, by way of example only, with reference to the attached Figures, wherein.

DETAILED DESCRIPTION

Figure 1:
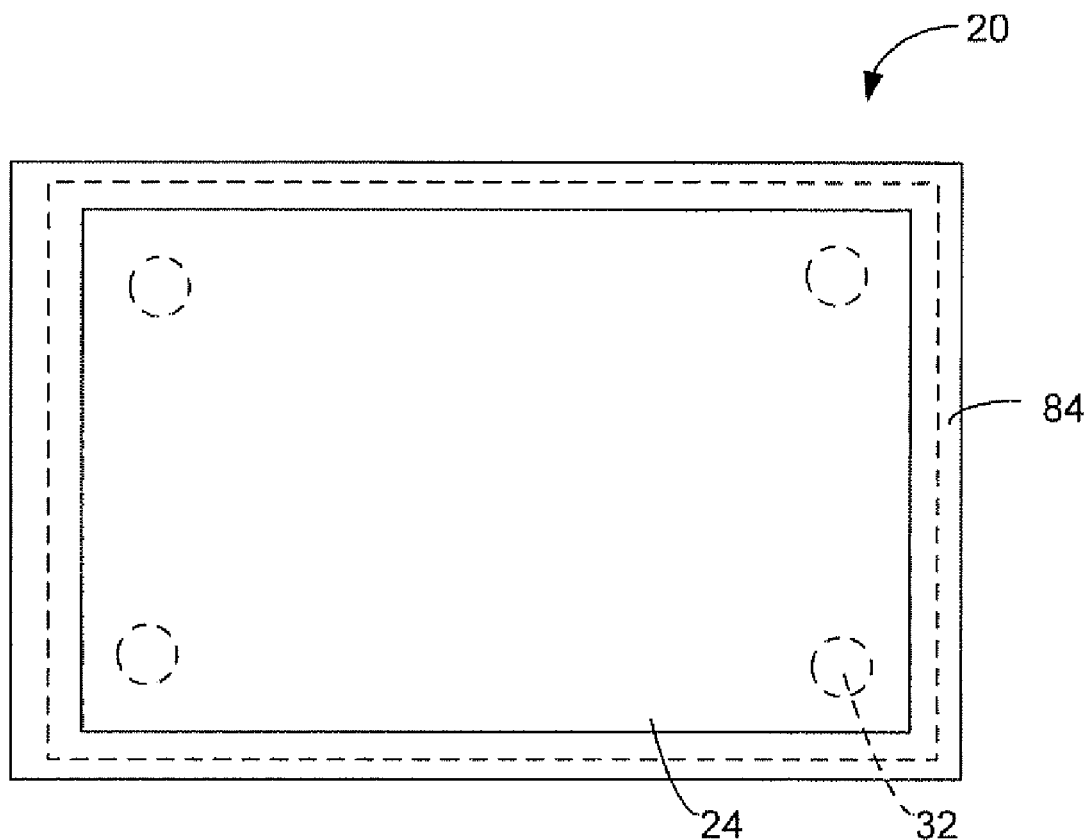
FIG. 1 is a top view of a portable electronic device according to one embodiment, with certain hidden features shown in ghost outline for the purpose of illustration.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The embodiments described herein generally relate to a portable electronic device having a display. Examples of portable electronic devices include mobile, or handheld, wireless communication devices such as pagers, cellular phones, cellular smart-phones, wireless organizers, personal digital assistants, wirelessly enabled notebook computers and the like.

The portable electronic device may be a two-way communication device with advanced data communication capabilities including the capability to communicate with other portable electronic devices or computer systems through a network of transceiver stations. The portable electronic device may also have the capability to allow voice communication. Depending on the functionality provided by the portable electronic device, it may be referred to as a data messaging device, a two-way pager, a cellular telephone with data messaging capabilities, a wireless Internet appliance, or a data communication device (with or without telephony capabilities). The portable electronic device may also be a portable device without wireless communication capabilities as a handheld electronic game device, digital photograph album, digital camera and the like.

Figure 2:
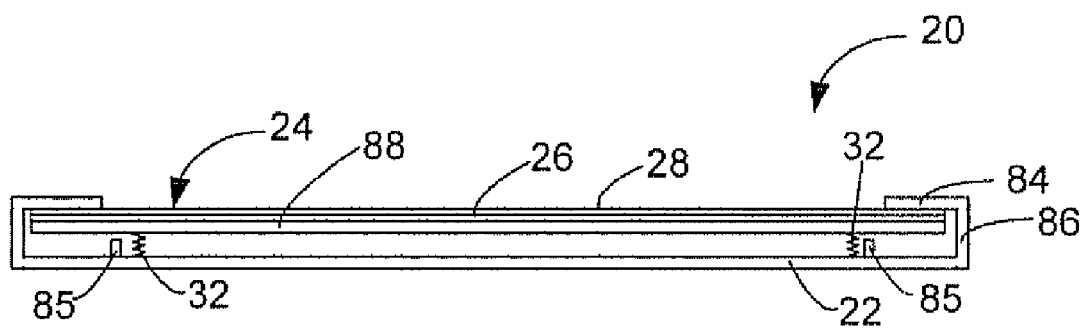
FIG. 2 is a sectional side view of the portable electronic device of FIG. 1.
Figure 3:
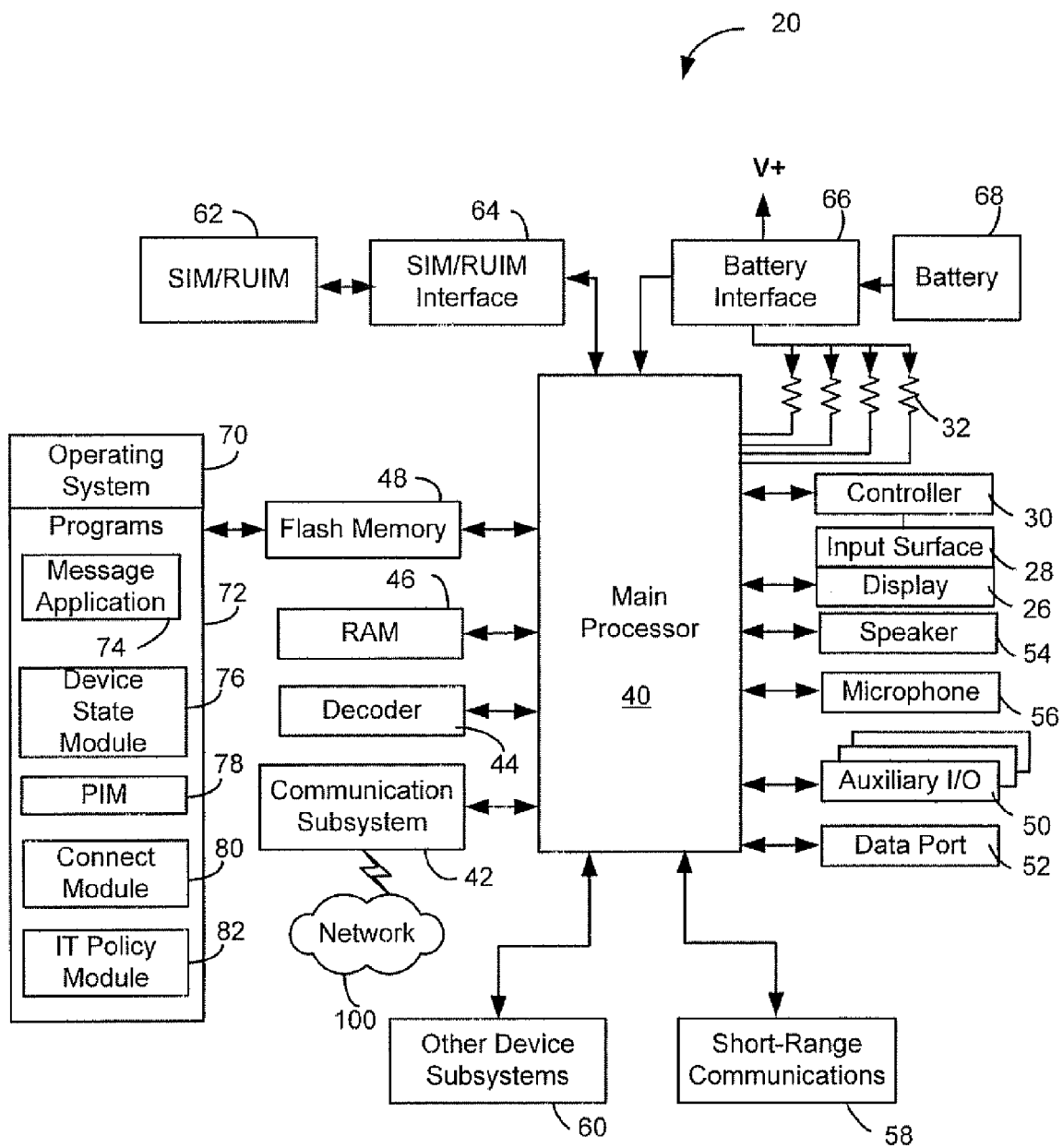
FIG. 3 is a block diagram of certain components, including certain internal components of the portable electronic device of FIG. 1.

Referring to FIGS. 1 to 3, a portable electronic device 20 is indicated generally by the numeral 20. The portable electronic device 20 includes a base 22 and a touch screen display 24 that is connected to the base 22 and moveable relative to the base 22. The touch screen display 24 and includes a display device 26 and a touch-sensitive input surface 28 overlying the display device and connected to a controller 30 for determining a touch event to the touch-sensitive input surface 28. A shape memory alloy 32 is disposed between the base 22 and the display device 26 and is configured to change shape in response to conduction of an electric current to cause movement of the display device 26 relative to the base 22. The operational components include a processor 40 between the base 22 and the touch screen display 24. The processor 40 is operatively connected to the controller 30, the display device 26 and the shape memory alloy 32 for causing conduction of current through the shape memory alloy 32 in response to the touch event, resulting in movement of the touch screen display 24 relative to the base 22.

Referring now to FIG. 3, a block diagram of an exemplary embodiment of a portable electronic device 20 is shown. The portable electronic device 20 includes a number of components such as the processor 40 that controls the overall operation of the portable electronic device 20. Communication functions, including data and voice communications, are performed through a communication subsystem 42. Data received by the portable electronic device 20 can be decompressed and decrypted by decoder 44, operating according to any suitable decompression techniques (e.g. YK decompression, and other known techniques) and encryption techniques (e.g. using an encryption techniques such as Data Encryption Standard (DES), Triple DES, or Advanced Encryption Standard (AES)). The communication subsystem 42 receives messages from and sends messages to a wireless network 100. In this exemplary embodiment of the portable electronic device 20, the communication subsystem 42 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 42 with the wireless network 100 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 100 associated with portable electronic device 20 is a GSM/GPRS wireless network in one exemplary implementation, other wireless networks may also be associated with the portable electronic device 20 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA1000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems. The processor 40 also interacts with additional subsystems such as a Random Access Memory (RAM) 46, a flash memory 48, the display 26 with the input surface 28, an auxiliary input/output (I/O) subsystem 50, a data port 52, a speaker 54, a microphone 56, short-range communications 58 and other device subsystems 60.

Some of the subsystems of the portable electronic device 20 perform communication-related functions, whereas other subsystems may provide "resident" or on-device functions. By way of example, the display device 26 and the touch-sensitive input surface 28 may be used for both communication-related functions, such as entering a text message for transmission over the network 100, and device-resident functions such as a calculator or task list.

The portable electronic device 20 can send and receive communication signals over the wireless network 100 after network registration or activation procedures have been completed. Network access is associated with a subscriber or user of the portable electronic device 20. To identify a subscriber according to the present embodiment, the portable electronic device 20 uses a SIM/RUIM card 62 (i.e. Subscriber Identity Module or a Removable User Identity Module) to be inserted into a SIM/RUIM interface 64 in order to communicate with a network. The SIM card or RUIM 62 is one type of a conventional "smart card" that can be used to identify a subscriber of the portable electronic device 20 and to personalize the portable electronic device 20, among other things. In the present embodiment the portable electronic device 20 is not fully operational for communication with the wireless network 100 without the SIM card 62. By inserting the SIM card/RUIM 62 into the SIM/RUIM interface 64, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 62 includes a processor and memory for storing information. Once the SIM card/RUIM 62 is inserted into the SIM/RUIM interface 64, it is coupled to the processor 40. In order to identify the subscriber, the SIM card/RUIM 62 can include some user parameters such as an International Mobile Subscriber Identity (IMSI). An advantage of using the SIM card/RUIM 62 is that a subscriber is not necessarily bound by any single physical portable electronic device. The SIM card/RUIM 62 may store additional subscriber information for a portable electronic device as well, including datebook (or calendar) information and recent call information. Alternatively, user identification information can also be programmed into the flash memory 48.

The portable electronic device 20 is a battery-powered device and includes a battery interface 66 for receiving one or more rechargeable batteries 68. In at least some embodiments, the battery 68 can be a smart battery with an embedded microprocessor. The battery interface 66 is coupled to a regulator (not shown), which assists the battery 68 in providing power V+ to the portable electronic device 20. Although current technology makes use of a battery, future technologies such as micro fuel cells may provide the power to the portable electronic device 20.

The portable electronic device 20 also includes an operating system 70 and software components 72 to 82 which are described in more detail below. The operating system 70 and the software components 72 to 82 that are executed by the processor 40 are typically stored in a persistent store such as the flash memory 48, which may alternatively be a read-only memory (ROM) or similar storage element (not shown). Those skilled in the art will appreciate that portions of the operating system 70 and the software components 72 to 82, such as specific device applications, or parts thereof, may be temporarily loaded into a volatile store such as the RAM 46. Other software components can also be included, as is well known to those skilled in the art.

The subset of software applications 72 that control basic device operations, including data and voice communication applications, will normally be installed on the portable electronic device 20 during its manufacture. Other software applications include a message application 74 that can be any suitable software program that allows a user of the portable electronic device 20 to send and receive electronic messages. Various alternatives exist for the message application 74 as is well known to those skilled in the art. Messages that have been sent or received by the user are typically stored in the flash memory 48 of the portable electronic device 20 or some other suitable storage element in the portable electronic device 20. In at least some embodiments, some of the sent and received messages may be stored remotely from the device 20 such as in a data store of an associated host system that the portable electronic device 20 communicates with.

The software applications can further include a device state module 76, a Personal Information Manager (PIM) 78, and other suitable modules (not shown). The device state module 76 provides persistence, i.e. the device state module 76 ensures that important device data is stored in persistent memory, such as the flash memory 48, so that the data is not lost when the portable electronic device 20 is turned off or loses power.

The PIM 78 includes functionality for organizing and managing data items of interest to the user, such as, but not limited to, e-mail, contacts, calendar events, voice mails, appointments, and task items. A PIM application has the ability to send and receive data items via the wireless network 100. PIM data items may be seamlessly integrated, synchronized, and updated via the wireless network 100 with the portable electronic device subscriber's corresponding data items stored and/or associated with a host computer system. This functionality creates a mirrored host computer on the portable electronic device 20 with respect to such items. This can be particularly advantageous when the host computer system is the portable electronic device subscriber's office computer system.

The portable electronic device 20 also includes a connect module 80, and an information technology (IT) policy module 82. The connect module 80 implements the communication protocols that are required for the portable electronic device 20 to communicate with the wireless infrastructure and any host system, such as an enterprise system, that the portable electronic device 20 is authorized to interface with.

The connect module 80 includes a set of APIs that can be integrated with the portable electronic device 20 to allow the portable electronic device 20 to use any number of services associated with the enterprise system. The connect module 80 allows the portable electronic device 20 to establish an end-to-end secure, authenticated communication pipe with the host system. A subset of applications for which access is provided by the connect module 80 can be used to pass IT policy commands from the host system to the portable electronic device 20. This can be done in a wireless or wired manner. These instructions can then be passed to the IT policy module 82 to modify the configuration of the device 20. Alternatively, in some cases, the IT policy update can also be done over a wired connection.

Other types of software applications can also be installed on the portable electronic device 20. These software applications can be third party applications, which are added after the manufacture of the portable electronic device 20. Examples of third party applications include games, calculators, utilities, etc.

The additional applications can be loaded onto the portable electronic device 20 through at least one of the wireless network 100, the auxiliary I/O subsystem 50, the data port 52, the short-range communications subsystem 58, or any other suitable device subsystem 60. This flexibility in application installation increases the functionality of the portable electronic device 20 and may provide enhanced on-device functions, communication-related functions, or both. For example, secure communication applications may enable electronic commerce functions and other such financial transactions to be performed using the portable electronic device 20.

The data port 52 enables a subscriber to set preferences through an external device or software application and extends the capabilities of the portable electronic device 20 by providing for information or software downloads to the portable electronic device 20 other than through a wireless communication network. The alternate download path may, for example, be used to load an encryption key onto the portable electronic device 20 through a direct and thus reliable and trusted connection to provide secure device communication.

The data port 52 can be any suitable port that enables data communication between the portable electronic device 20 and another computing device. The data port 52 can be a serial or a parallel port. In some instances, the data port 52 can be a USB port that includes data lines for data transfer and a supply line that can provide a charging current to charge the battery 68 of the portable electronic device 20.

The short-range communications subsystem 58 provides for communication between the portable electronic device 20 and different systems or devices, without the use of the wireless network 100. For example, the subsystem 58 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download is processed by the communication subsystem 42 and input to the processor 40. The processor 40 then processes the received signal for output to the display 28 or alternatively to the auxiliary I/O subsystem 50. A subscriber may also compose data items, such as e-mail messages, for example, using the touch-sensitive input surface 28 in conjunction with the display device 26 and possibly the auxiliary I/O subsystem 50. The auxiliary I/O subsystem 50 may include devices such as a mouse, track ball, infrared fingerprint detector, or a roller wheel with dynamic button pressing capability. A keyboard can also be provided, such as an alphanumeric keyboard or a telephone-type keypad or both. A composed item may be transmitted over the wireless network 100 through the communication subsystem 42.

For voice communications, the overall operation of the portable electronic device 20 is substantially similar, except that the received signals are output to the speaker 54, and signals for transmission are generated by the microphone 56. Alternative voice or audio I/O subsystems, such as a voice message recording subsystem, can also be implemented on the portable electronic device 20. Although voice or audio signal output is accomplished primarily through the speaker 54, the display 28 can also be used to provide additional information such as the identity of a calling party, duration of a voice call, or other voice call related information.

Referring again to FIGS. 1 and 2, the housing includes the base 22 and a frame 84 spaced from the base 22 that frames the touch screen display 24. Sidewalls 86 extend between the base 22 and the frame 84. According to the present embodiment, the sidewalls 86 extend generally perpendicularly to the base 22 and the frame 84. The base 22 includes a plate (not shown) that is releasably attached for insertion and removal of, for example, the battery 68 and the SIM card 62 described above. It will be appreciated that the base 22, the sidewalls 86 and the frame 84 can be injection molded, for example. The frame 84 is sized and shaped to frame a window in which the touch screen display 24 is exposed for input by user contact with the touch-sensitive input surface 28 of the touch screen display 24 and for displaying output on the display device 26. The touch screen display 24 is biased against the underside of the frame 84 by the shape memory alloy 32, which in the present embodiment includes four coil springs, as best shown in FIG. 2. Thus, the frame 84 maintains the touch screen display 24 within the housing and the touch screen display 24 is constrained by the housing. The touch screen display 24 is moveable within the housing, however. A mechanical stop 85 is included to limit the range of movement of the touch screen display 24 in the direction of the base 22. Thus, the mechanical stop 85 limits the range of movement of the touch screen display 24 for protecting the operational components between the base 22 and the touch screen display 24 and the shape memory alloy 32. In the present embodiment, the mechanical stop 85 includes posts extending upwardly from the base 22. The mechanical stop 85 can be any suitable mechanical stop, however, including, for example, an inward projection from the sidewalls 86 or a tube located around the coil springs of shape memory alloy 32. It will now be appreciated that the touch screen display 24 is connected to the housing and the base 22 and moveable relative thereto. It is contemplated that the edges of the touch screen display 24 can include an edge support surrounding the edges to provide support and thus, the edge support contacts the frame 84 of the housing. According to the embodiment shown in FIG. 1, the frame 84 is generally rectangular although other shapes are possible. For example, the corners of the frame 84 can be rounded.

The touch screen display 24 is supported by a rigid display support 88 to provide structural support to the touch screen display 24 and inhibit bending causing damage or breaking of the touch screen display 24. The display support 88 can be formed of any suitable material and can include further functional components such as a printed circuit board. It will be appreciated that the touch screen display 24 is an assembly of components including, the touch-sensitive input surface 28 overlying the LCD display device 26 and other components including optional components such as a backlight (not shown).

The touch screen display 24 can be any suitable touch screen display such as a capacitive touch screen display 24 including the display device 26, which in the present embodiment is an LCD display, and the touch-sensitive input surface 28. It will be appreciated that the touch-sensitive input surface 28 includes a number of layers in a stack. The layers include, for example, layers of substrate, ground shield, and electrically isolated capacitive touch sensor circuit layers as well as a cover lens. The capacitive touch sensor circuit layers of the touch-sensitive input surface 28 are connected to the electronic controller 30 shown in FIG. 3 via conductive lead lines (not shown) formed of any suitable conductive material such as copper or gold. The location of a touch on the touch-sensitive input surface 28 of the touch screen display 24 is determined using the touch sensor circuit layers to determine X and Y co-ordinates of the touch. The capacitive touch sensor circuit layers each provide a signal to the controller 30 in response to a touch from a user resulting in a change in the electric field of each of the capacitive touch sensor circuit layers. The signals represent the respective one of the X and Y touch locations.

In use, a screen is displayed on the display device 26, including options or commands for selection by a user of the portable electronic device 20. The capacitive touch sensor circuit layers are each driven with a current to provide an electric field that changes upon user touching of the touch-sensitive input surface 28 as a result of capacitive coupling.

The change in the electric field signals the controller 30 that a touch has occurred and the X and Y co-ordinates of the touch location are determined at the controller. The co-ordinates of the touch are used by the processor 40 to determine the associated option or command selected by the user from the screen displayed on the LCD display 32. The processor 40 performs actions based on the determined associated option or command.

The touch screen display 24 is not limited to the determination of a single location of a static touch event. Instead, motions such as the sliding of a finger along the touch screen display 24 can be determined. Further, it is contemplated that touches at more than one location on the touch screen display 24 can be determined and motions such as increasing or decreasing the distance between finger touch locations can be determined. Each type of touch event and the location (co-ordinates) of the touch or touches can result in the initiation of different commands at the processor 40. Thus, the touch screen display 24 provides a graphical user interface for user interaction.

Figure 4A:
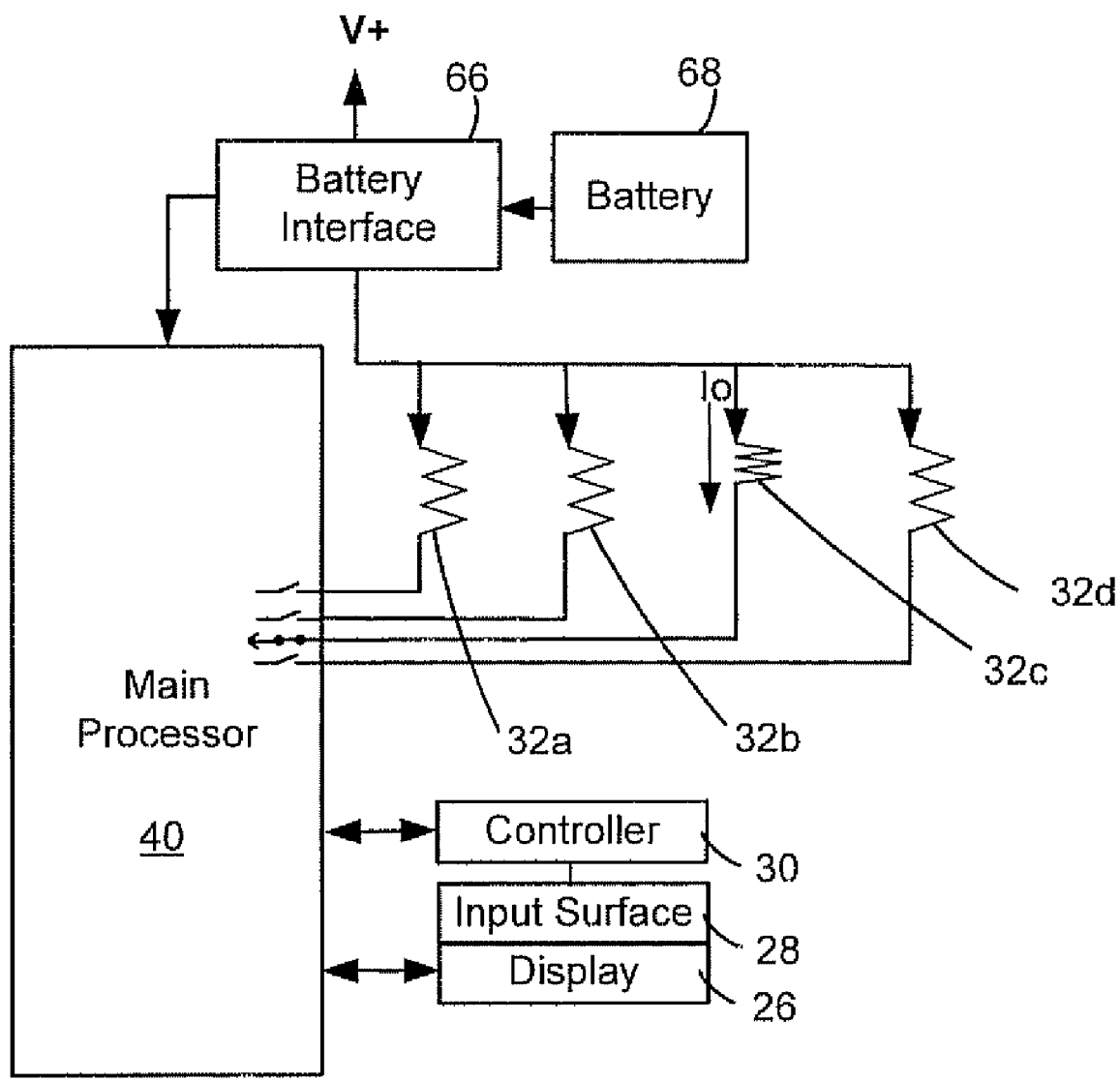
FIG. 4A is a block diagram showing a portion of the components of FIG. 3, including a shape memory alloy wire shown in a compressed state.
Figure 4B:
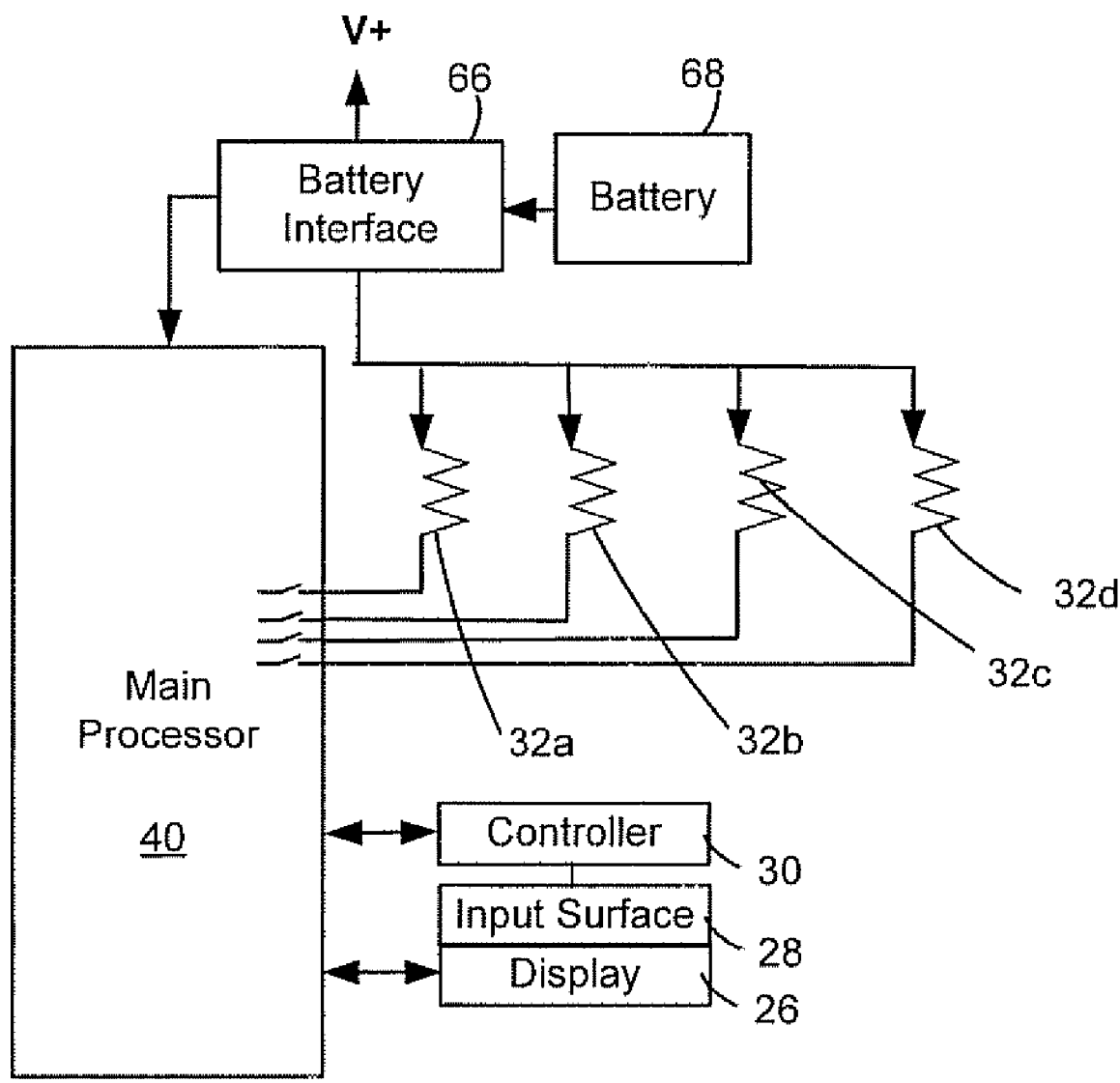
FIG. 4B is a block diagram similar to FIG. 4, showing the shape memory alloy wire in an extended state.

As indicated above, the touch screen display 24 is biased away from the base 22, toward the frame 84. In one embodiment, the shape memory alloy 32 biases the touch screen display 24 toward the frame 84. It will be appreciated, however, that the touch screen display 24 can be biased toward the frame 84 by any suitable biasing element or elements such as foam biasing elements or other suitable elements. The shape memory alloy 32 in the present exemplary embodiment includes four wires 32*a*, 32*b*, 32*c*, 32*d* in the shape of coil springs as shown in FIGS. 3, 4A and 4B. Each one of the four wires 32*a*, 32*b*, 32*c*, 32*d* is located proximal a respective corner of the portable electronic device 20, as shown in ghost outline in FIG. 1 and is mechanically connected to the base 22 and to the rigid display support 88 by suitable mechanical connection. Each of the wires 32*a*, 32*b*, 32*c*, 32*d* is electrically connected at one end to the battery interface 66 for providing electric current to the respective wire 32*a*, 32*b*, 32*c*, 32*d* when a circuit is completed. The other end of each wire 32*a*, 32*b*, 32*c*, 32*d* is electrically connected to the processor 40 for controlling completion of each of the circuits and thereby controlling current flow through each of the wires 32*a*, 32*b*, 32*c*, 32*d*. The wires 32*a*, 32*b*, 32*c*, 32*d* can be muscle wires, for example, or any suitable shape memory alloy 32. Further, the shape memory alloy 32 is not limited to four coil springs as other suitable shapes of shape memory alloy 32 can be used. For example, the shape memory alloy 32 can take the form of a thin ribbon or other suitable shape. Further still, other numbers of shape memory alloy 32 can be used.

Those skilled in the art will appreciate that shape memory alloys assume different shapes at distinct temperatures as a result of a temperature-dependent martensitic phase transformation from martensite at lower temperatures to austenite a higher temperatures. The temperature at which the phase transformation occurs is dependent on the alloy. The shape memory alloy in the present embodiment includes wires 32*a*, 32*b*, 32*c*, 32*d*, which can be muscle wires. Muscle wires are thin, highly processed strands of nickel-titanium alloy, commonly referred to as Nitinol or Flexinol. The wires 32*a*, 32*b*, 32*c*, 32*d* have two, temperature-dependent shapes including an extended spring-shaped room temperature state indicated by the numerals 32*a*, 32*b* and 32*d* in FIG. 4A, and a compressed spring-shaped heated state indicated by the numeral 32*c* (not to scale). Thus, the length of each of the coil springs of wire 32*a*, 32*b*, 32*c*, 32*d* is reduced or shrinks in the heated state. When the wire returns to room temperature, the length of the coil spring of wire 32*a*, 32*b*, 32*c*, 32*d* returns to the extended length. The wire 32c is shown in the compressed spring-shaped heated state in FIG. 4A and in the extended spring-shaped room temperature state in FIG. 4B.

When electric current is conducted through any or all of the coil spring-shaped wires 32, the respective wire heats and undergoes the phase transformation to the compressed spring-shaped heated state as shown by the wire 32c in FIG. 4A. The wire 32c in FIG. 4A is referred to as being activated as a result of electric current conduction, indicated by the arrow labeled Io, causing the change to the compressed spring-shaped heated state. When electric current flow stops, the wire 32c cools and returns to the original phase, thereby returning to the extended spring-shaped room temperature state as shown in FIG. 4B. Those skilled in the art will appreciate that the current required to activate a wire from room temperature is dependent on the alloy and the diameter of the wire. One suitable shape memory alloy is a muscle wire, as indicated. According to one exemplary embodiment, the wires 32a, 32b, 32c, 32d are muscle wires with a diameter in the range of 0.04 mm to 1 mm, which are formed into coil springs having a coil diameter in the range of 2 mm to 10 mm. As indicated above, the shape memory alloy is not limited to coil springs as other shapes of shape memory alloy can be used. For example, a thin ribbon or other suitable shape that, when current flow through, changes to a compressed state and, when current stops flowing through, returns to an extended state.

As described hereinabove, the X and Y co-ordinates of a user touch on the touch screen display 24 are determined at the controller 30 and the co-ordinates of the touch are used by the processor 40 to determine the associated option or command selected by the user. The co-ordinates of the touch are also used by the processor 40 to determine which of the four wires 32a, 32b, 32c, 32d to activate by completing a circuit to cause current flow, resulting in a change in shape, from the extended spring-shaped room temperature state to the compressed spring-shaped heated state. The one or ones of the four wires 32a, 32b, 32c, 32d that are activated is dependent on the location of the user-touch.

Figure 5:
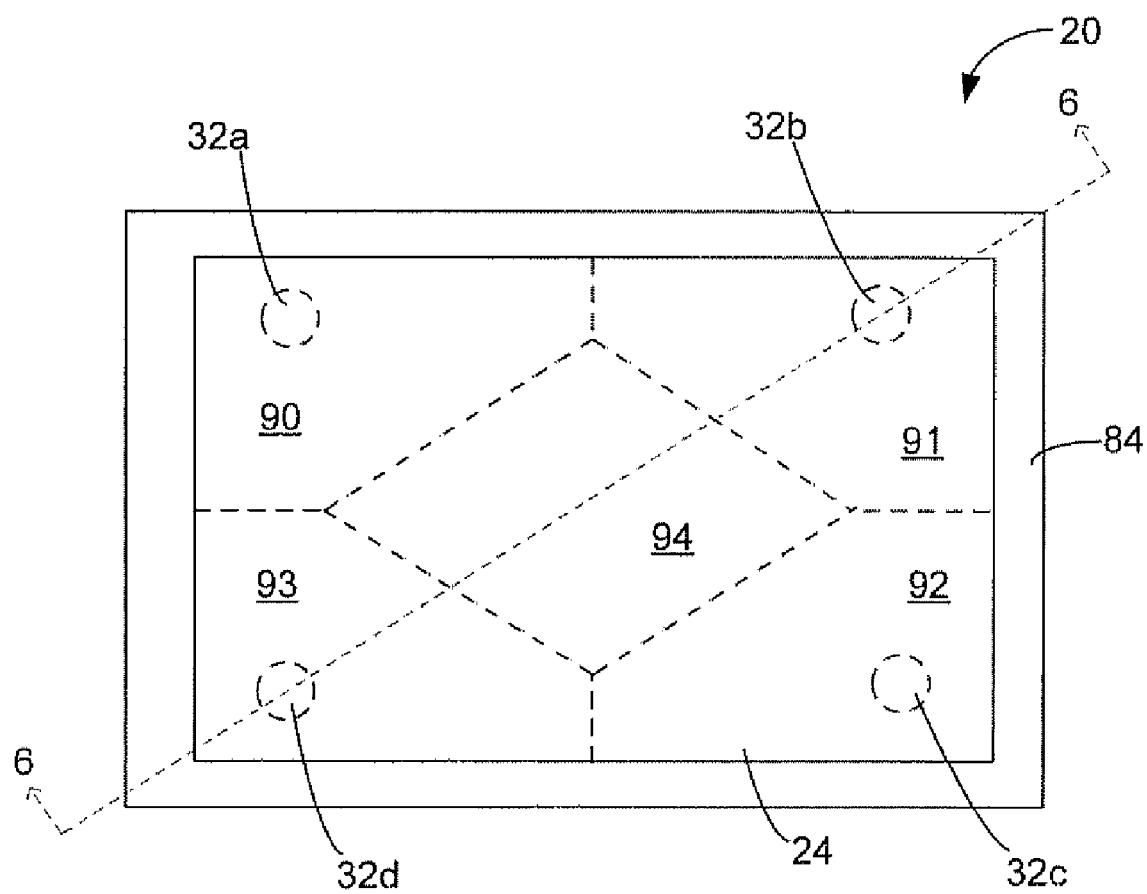
FIG. 5 is a top view of the portable electronic device of FIG. 1, showing screen areas in ghost outline.

In one example, the touch-sensitive input surface 28 is effectively divided into five areas 90, 91, 92, 93, 94, as shown in ghost outline in FIG. 5. It will be appreciated that these divisions are not shown on the touch screen display 24. When the X and Y co-ordinates of a user-touch are determined to fall within, for example, the area 90 shown in the top left hand corner of the touch screen display 24 of the portable electronic device 20 in the view of FIG. 5, the wire 32a is activated as the processor 40 completes the circuit causing current flow through the wire 32a, resulting in a change in shape from the extended spring-shaped room temperature state to the compressed spring-shaped heated state. The change in shape results in movement of the touch screen display 24 as the wire 32a connected between the base 22 and the touch screen display 24 shrinks in length.

If, however, the X and Y co-ordinates are determined to fall within, the area 92, shown in the top right hand corner of the touch screen display 24 of the portable electronic device 20 in the view of FIG. 5, the wire 32b proximal to the top right hand corner of the portable electronic device 20 in the view of FIG. 5, is activated as the processor 40 completes the circuit causing current flow through the wire 32b, resulting in a change in shape from the extended spring-shaped room temperature state to the compressed spring-shaped heated state. The change in shape results in movement of the touch screen display 24 as the wire 32b connected between the base 22 and the touch screen display 24 shrinks in length.

When the X and Y co-ordinates are determined to fall within the area 92, shown in the bottom right hand corner of the touch screen display 24 of the portable electronic device 20 in the view of FIG. 5, the wire 32c proximal to the bottom right hand corner of the portable electronic device 20 in the view of FIG. 5, is activated as the processor 40 completes the circuit causing current flow through the wire 32c, resulting in a change in shape from the extended spring-shaped room temperature state to the compressed spring-shaped heated state. The change in shape results in movement of the touch screen display 24 as the wire 32c connected between the base 22 and the touch screen display 24 shrinks in length.

When the X and Y co-ordinates are determined to fall within the area 93, shown in the bottom left hand corner of the touch screen display 24 of the portable electronic device 20 in the view of FIG. 5, the wire 32d proximal to the bottom left hand corner of the portable electronic device 20 in the view of FIG. 5, is activated as the processor 40 completes the circuit causing current flow through the wire 32d, resulting in a change in shape from the extended spring-shaped room temperature state to the compressed spring-shaped heated state. The change in shape results in movement of the touch screen display 24 as the wire 32d connected between the base 22 and the touch screen display 24 shrinks in length.

When the X and Y co-ordinates are determined to fall within the area 94, shown in the area that includes the center of the touch screen display 24 of the portable electronic device 20 in the view of FIG. 5, all four wires 32a, 32b, 32c, 32d are activated as the processor 40 completes the circuits for each, causing current flow through the wires 32a, 32b, 32c, 32d, resulting in a change in shape from the extended spring-shaped room temperature state to the compressed spring-shaped heated state. The change in shape results in movement of the touch screen display 24 as the wires 32a, 32b, 32c, 32d connected between the base 22 and the touch screen display 24 each shrink in length.

Figure 6:
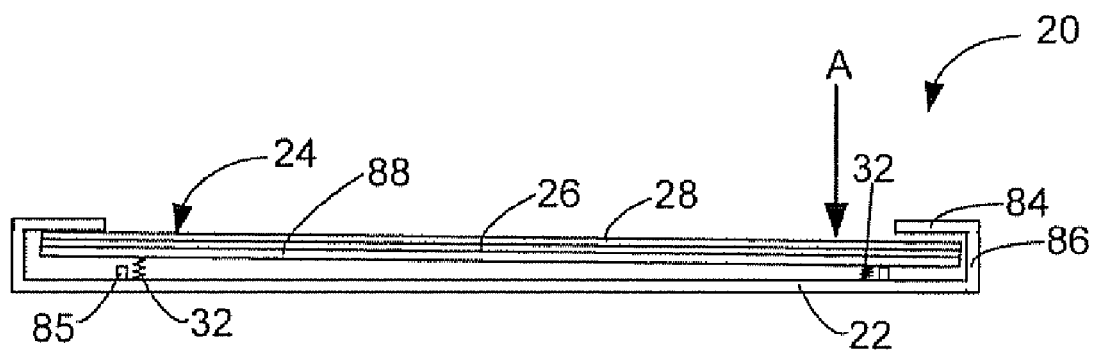
FIG. 6 is a sectional side view of the portable electronic device of FIG. 1, showing a touch event at a point on the touch screen display.

Reference is now made to FIGS. 6 to 8 and 9 to describe a method of controlling an electronic device 20 causing movement of the touch screen display 24 relative to the base 22 of the portable electronic device 20. Referring first to FIG. 6, there is shown a sectional side view of portions of the portable electronic device 20, according to one embodiment. In the present example, a user touches the touch-sensitive input surface 28 at the area 91 (FIG. 5) of the touch screen display 24, by pressing in the direction of the arrow "A" (step 110). The X and Y co-ordinates of the location of the touch on the touch-sensitive input surface 28 are determined at the controller 30 and the co-ordinates of the touch are provided to the processor 40 (step 112). The processor 40 uses the co-ordinates of the touch to determine the associated option or command selected by the user based on the location of the touch (step 114) and carries out the appropriate action or actions accordingly (step 116). The co-ordinates of the touch are also used by the processor 40 to determine the associated wire 32b (the wire 32 to activate) (step 118) and then complete the circuit including the wire 32b to cause current flow resulting in a change in shape from the extended spring-shaped room temperature state to the compressed spring-shaped heated state (step 120). The touch screen display 24 moves as a result of the change in length of the coil-spring shaped wire 32b, as shown in FIG. 6. It will be appreciated that the Figures are not to scale and the movement of the touch screen display 24 is exaggerated for the purpose of illustration. As shown, the touch screen display 24 pivots in the present example to provide the user with a tactile response.

Figure 7:
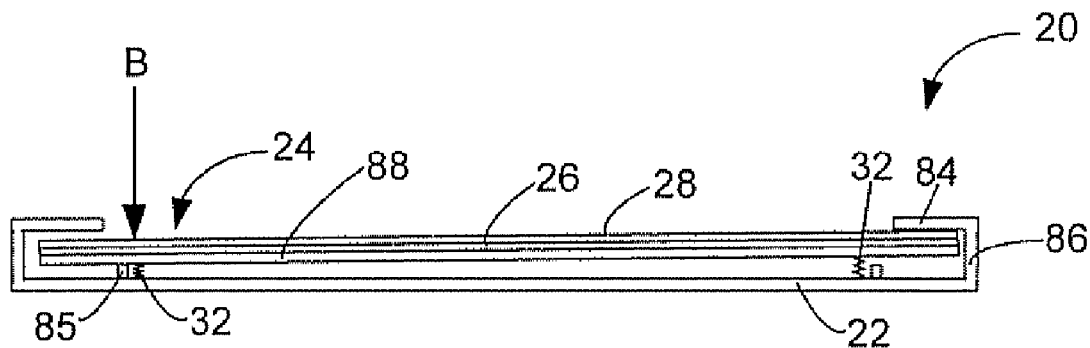
FIG. 7 is a sectional side view of the portable electronic device of FIG. 1, showing a touch event at another point on the touch screen display.

Referring now to FIG. 7, there is shown a sectional side view of portions of the portable electronic device 20, similar to FIG. 6. In the present example, however, a user touches the touch-sensitive input surface 28 at the area 93 (FIG. 5) of the touch screen display 24, by pressing in the direction of arrow "B" (step 110). The X and Y co-ordinates of the location of the touch on the touch-sensitive input surface 28 are determined at the controller 30 and the co-ordinates of the touch are provided to the processor 40 (step 112). The processor 40 uses the co-ordinates of the touch to determine the associated option or command selected by the user (step 114) and carry out the appropriate action or actions based on the option or command determined at step 114 (step 116). The co-ordinates of the touch are also used by the processor 40 to determine the associated wire 32d (step 118) to activate and then complete the circuit including the wire 32d to cause current flow resulting in a change in shape from the extended spring-shaped room temperature state to the compressed spring-shaped heated state (step 120). The touch screen display 24 moves as a result of the change in length of the coil-spring shaped wire 32d, as shown in FIG. 7. Again, it will be appreciated that the Figures are not to scale and the movement of the touch screen display 24 is exaggerated for the purpose of illustration. Again, the touch screen display 24 pivots in the present example to provide the user with a tactile response.

Figure 8:
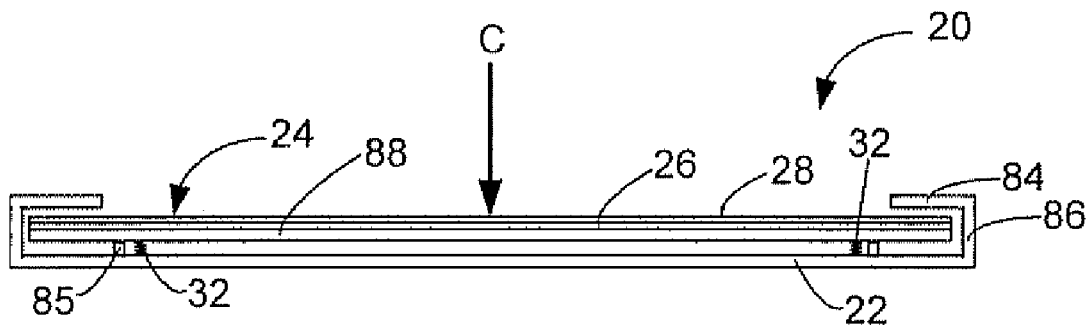
FIG. 8 is a sectional side view of the portable electronic device of FIG. 1 showing a touch event at yet another point on the touch screen display.
Figure 9:
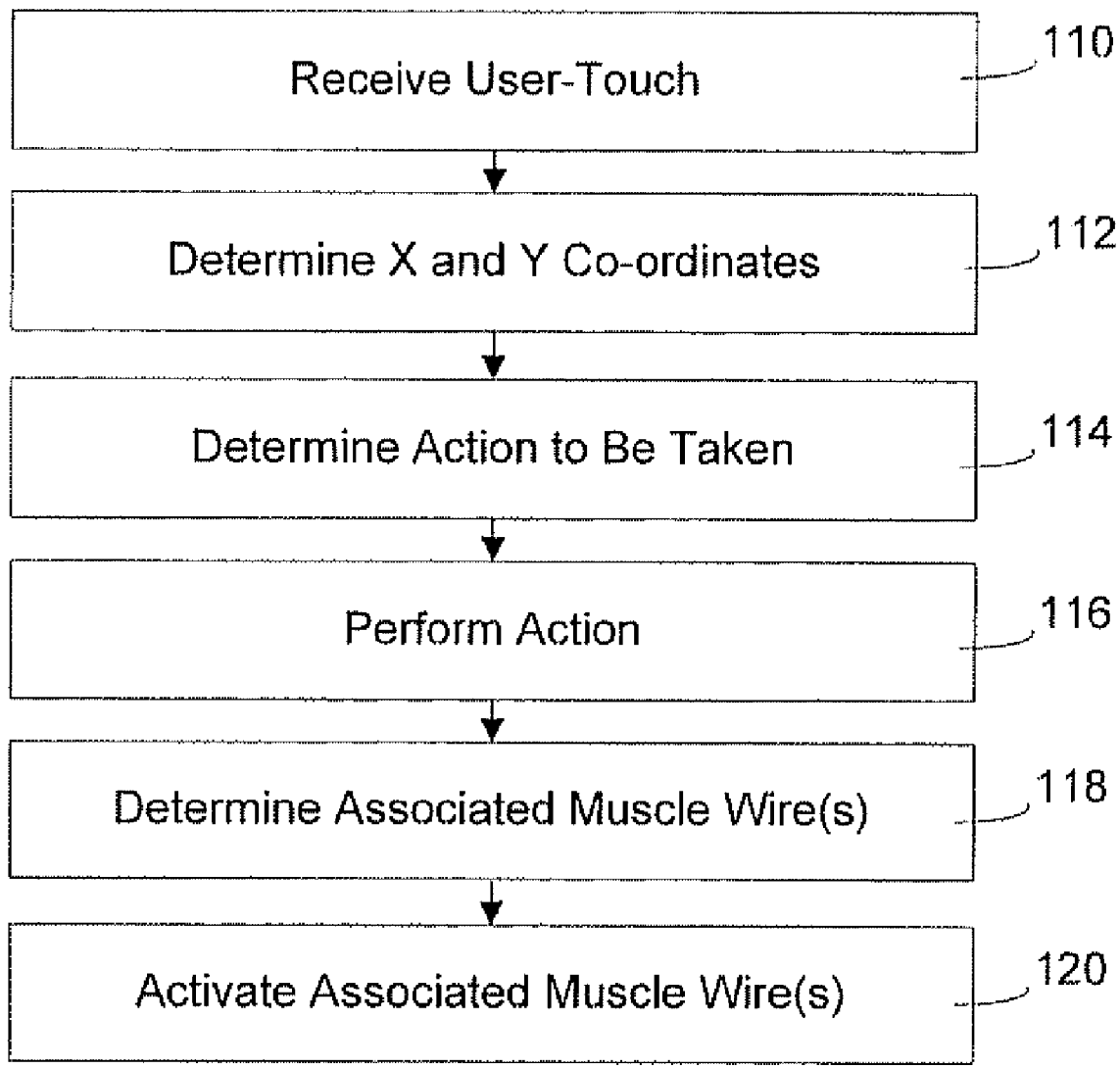
FIG. 9 is a flow chart illustrating steps in a method of controlling the electronic device of FIG. 1.

Referring now to FIG. 8, there is shown a sectional side view of portions of the portable electronic device 20, similar to FIGS. 5 and 6. In the present example, a user touches the touch-sensitive input surface 28 at the area 94 (FIG. 5) of the touch screen display 24, by pressing in the direction of arrow "C" (step 110). The X and Y co-ordinates of the location of the touch on the touch-sensitive input surface 28 are determined at the controller 40 and the co-ordinates of the touch are again provided to the processor 40 (step 112) for determining the associated option or command selected by the user (step 114) and performing the appropriate actions based on the option or command determined at step 114 (step 116). The co-ordinates of the touch are used by the processor 40 to determine the associated coil spring wires 32a, 32b, 32c, 32d (step 118) and then complete each of the circuits including the respective coil spring shaped wires 32a, 32b, 32c, 32d to cause current flow through each wire 32a, 32b, 32c, 32d resulting in a change in shape from the extended spring-shaped room temperature state to the compressed spring-shaped heated state (step 120). The touch screen display 24 moves as a result of the change in length of all of the coil-spring shaped wires 32a, 32b, 32c, 32d, as shown in FIG. 8. Again, it will be appreciated that the Figures are not to scale and the movement of the touch screen display 24 is exaggerated for the purpose of illustration. In the present example, each of the four wires 32a, 32b, 32c, 32d shrinks and, rather than pivoting, the touch screen display 24 moves generally parallel to the base 22.

With the movement of the touch screen display 24 relative to the base 22 caused by the phase change in the wire or wires 32a, 32b, 32c, 32d, the user is provided with a tactile response during user interaction with the graphical user interface.

As indicated above, the touch screen display 24 can be any suitable touch screen display and is not limited to a capacitive touch screen display. The touch screen display can be, for example, a resistive touch screen display or any other suitable touch screen display, as will be appreciated by those skilled in the art.

As described, the touch screen display 24 is not limited to the determination of a single location of a static touch event. Instead, motions such as the sliding of a finger along the touch screen display 24 can be determined. Further, it is contemplated that touches at more than one location on the touch screen display 24 can be determined and motions such as increasing or decreasing the distance between finger touch locations can be determined. With more than one location of touch, more than one set of X and Y co-ordinates can be used to determine which of the coil-shaped wires 32a, 32b, 32c, 32d to activate. Thus, more than one of the wires 32a, 32b, 32c, 32d can be activated without activating all four of the wires 32a, 32b, 32c, 32d. For example, two of the wires 32a, 32b, 32c, 32d that are located proximal corners that share a common side can be activated to cause the touch screen display 24 to pivot. Further still, the changing location or motion of the touch can result in a change in activation from one or all of the coil shaped wires 32a, 32b, 32c, 32d to another or all of the coil-shaped wires 32a, 32b, 32c, 32d.

Although five areas are shown in the touch screen display 24 in the embodiment shown in FIG. 5, it will be appreciated that these areas are shown for exemplary purposes only and other areas can be employed. For example, the X and Y co-ordinates can be determined, followed by activation of the nearest one or ones of the four wires 32a, 32b, 32c, 32d. Further, the shape of the areas can differ from that shown. Further, a different number of wires can be used and the wires can be located at different positions between the base 22 and the touch screen display 24.

In the embodiments described above, the touch screen display 24 is framed by the frame 84, which is fixed to the base 22 by the sidewalls 86. It is contemplated that base 22 can be fixed to the touch screen display 24 by flexible sidewalls rather than, for example, rigid sidewalls. Such flexible sidewalls can be made of any suitable elastomer.

According to one aspect, there is provided a touch screen display unit. The touch screen display unit includes a base, a display device connected to the base and moveable relative to the base, a touch-sensitive input surface overlying the display device for determining a touch event thereto, and a shape memory alloy disposed between the base and the display device, the shape memory alloy configured for shrinking in response to conduction of electric current to cause movement of the display device relative to the base. The touch event causes conduction of electric current through the shape memory alloy, resulting in movement of the display device and touch-sensitive input surface relative to the base According to another aspect there is provided an electronic device. The electronic device includes a base, a touch screen display, a shape memory alloy and operational components. The touch screen display is connected to the base and moveable relative to the base and includes a display device and a touch-sensitive input surface overlying the display device and connected to a controller for determining a touch event to the touch-sensitive input surface. The shape memory alloy is disposed between the base and the display device and is configured to change shape in response to conduction of an electric current to cause movement of the display device relative to the base. The operational components include a processor between the base and the touch screen display. The processor is operatively connected to the controller, the display device and the shape memory alloy for causing conduction of current through the shape memory alloy in response to the touch event, resulting in movement of the touch screen display relative to the base.

According to yet another aspect, there is provided a method of controlling an electronic device. The method includes receiving a touch input at touch screen display, determining a location of the touch input on the touch screen display, and causing current conduction through a shape memory alloy disposed between a base and the touch screen display of the electronic device in response to receipt of the touch input. The current conduction results in a change in shape of the shape memory alloy to cause movement of the touch screen display relative to the base.

While the embodiments described herein are directed to particular implementations of the portable electronic device, it will be understood that modifications and variations to these embodiments are within the scope and sphere of the present application. For example, the size and shape of many of the features of the portable electronic device can differ while still providing the same function. Many other modifications and variations may occur to those skilled in the art. All such modifications and variations are believed to be within the sphere and scope of the present application.

What is claimed is:

1. A touch screen display unit comprising:
    a base;
    a display device coupled to the base and moveable relative to the base;
    a touch-sensitive input surface overlying the display device for determining a touch event thereto; and
    a plurality of shape memory alloy wires disposed between the base and the display device, a respective one of the plurality of the wires located near each of four corners of the display device, the shape memory alloy wires each configured to change shape in response to conduction of electric current to cause movement of the display device relative to the base,
    wherein the touch event causes conduction of electric current through at least one of the shape memory alloy wires determined based on location of the touch event, resulting in movement of the display device and touch-sensitive input surface relative to the base.

2. The touch screen display unit according to claim 1, wherein the shape memory alloy wires are each configured to shrink in response to conduction of electric current therethrough.

3. The touch screen display unit according to claim 1, comprising a controller for determining a location of the touch event.

4. The touch screen display unit according to claim 1, wherein the shape memory alloy wires comprise muscle wires.

5. The touch screen display unit according to claim 1, wherein the display device is arranged such that electric current is conducted through each of the plurality of wires located near each of the four corners of the display device in response to the location of the touch event being near a center of the touch sensitive input surface.

6. The touch screen display unit according to claim 1, wherein each of the wires are coil-spring shaped.

7. The touch screen display unit according to claim 1, comprising a frame spaced from the base by intermediary sidewalls and framing the display device and touch-sensitive input surface.

8. An electronic device comprising:
    a base;
    a touch screen display coupled to the base and moveable relative to the base, the touch screen display comprising a display device and a touch-sensitive input surface overlying the display device and coupled to a controller for determining a touch event to the touch-sensitive input surface;
    a plurality of shape memory alloy wires disposed between the base and the display device, a respective one of the plurality of the wires located near each of four corners of the display device, the shape memory alloy wires each configured to change shape in response to conduction of an electric current to cause movement of the display device relative to the base;
    a processor between the base and the touch screen display and operatively coupled to the controller, the display device and the shape memory alloy wires for causing conduction of current through at least one of the shape memory alloy wires determined based on location of the touch event, resulting in movement of the touch screen display relative to the base.

9. The electronic device according to claim 8, comprising a mechanical stop for limiting a range of motion of the touch screen display in the direction of the base.

10. The electronic device according to claim 8, wherein the shape memory alloy is configured to shrink in response to conduction of electric current therethrough.

11. The electronic device according to claim 8, wherein the shape memory alloy wires comprise muscle wires.

12. The electronic device according to claim 11, wherein display device is arranged such that electric current is conducted through each of the plurality of wires located near each of the four corners of the display device in response to the location of the touch event being near a center of the touch screen display.

13. The electronic device according to claim 8, wherein each of the wires is coil-spring shaped.

14. The electronic device according to claim 8, comprising a frame spaced from the base by intermediary sidewalls and framing the display device and touch-sensitive input surface.

15. A method of controlling an electronic device, the method comprising:
    receiving a touch input at a touch screen display;
    determining a location of the touch input on the touch screen display;
    causing current conduction through at least one of a plurality of shape memory alloy wires disposed between a base and the touch screen display of the electronic device in response to receipt of the touch input, a respective one of the plurality shape memory alloy wires located near each of four corners of the touch screen display, wherein the at least one of the shape memory alloy wires is determined based on location of the touch input, and the current conduction resulting in a change in shape of the shape memory alloy to cause movement of the touch screen display relative to the base.

* * * * *

UNITED STATES PATENT AND TRADEMARK OFFICE
CERTIFICATE OF CORRECTION

PATENT NO.      : 8,217,903 B2
APPLICATION NO. : 11/934204
DATED           : July 10, 2012
INVENTOR(S)     : ZhongMing Ma et al.

It is certified that error appears in the above-identified patent and that said Letters Patent is hereby corrected as shown below:

Column 14, line 30, claim 12, delete "11" and insert therefor --8--.

Signed and Sealed this
Eleventh Day of September, 2012

David J. Kappos
*Director of the United States Patent and Trademark Office*